April 28, 1964     J. K. STEWART     3,130,502
GYROSCOPICALLY STABILIZED CROSS LEVEL Filed June 30, 1961     2 Sheets-Sheet 1

INVENTOR
JOHN K. STEWART
BY *Smart + Biggar*
ATTORNEYS

April 28, 1964     J. K. STEWART     3,130,502
GYROSCOPICALLY STABILIZED CROSS LEVEL Filed June 30, 1961     2 Sheets-Sheet 2

INVENTOR
JOHN K. STEWART
BY— *Smart & Biggar*
ATTORNEYS

United States Patent Office 3,130,502
Patented Apr. 28, 1964

3,130,502
GYROSCOPICALLY STABILIZED CROSS LEVEL
John Kenneth Stewart, 60 Ballantyne Terrace,
Dorval, Quebec, Canada
Filed June 30, 1961, Ser. No. 121,073
6 Claims. (Cl. 33—204)

This invention relates to cross-level and super-elevation sensing devices for railroad tracks.

In my Canadian application, Serial No. 822,048, filed April 25, 1961, there is described and claimed a surveying device which includes a cross-level sensing device. One of the cross-level devices described in that application comprises a tube filled with mercury arranged between the source of light and a photoelectric cell receiver. The source of light, mercury filled tube, and receiver are attached to a shadow board mounted on rail engaging wheels and extending in a direction transversely of the railroad track. When the shadow board is tilted, due to the discrepancy in cross level or super-elevation, the mercury of the tube flows, in response to the tilting, to block off the light path between the light source and the photoelectric cell receiver. For particular types of track requiring certain tolerances and under certain working conditions the aforementioned type of cross level is suitable provided it is possible to slow down the working rate but it will be appreciated that in railroad maintenance it is not always possible to operate at a reduced rate of speed.

It is an object of the present invention to provide a cross-level sensing device, and this device could suitably be employed with the apparatus as described in my patent application aforementioned, which will give a fast response enabling high speeds of working to be achieved whilst retaining a high degree of accuracy.

According to the present invention a railroad track cross-level or super-elevation sensing device comprises a plurality of elements for establishing a light path including means for transmitting a light beam and means for receiving said light beam; gyroscopic reference datum means including means to control the light path between said transmitter and receiver; means responsive to the reception of the light beam by said receiver to indicate the cross-level or super-elevation condition of the railroad track; and means engaging each of the rails of the track and adapted to move at least one of the elements establishing the light path relative to said gyroscopic reference datum means in response to a change in track cross-level or super-elevation condition whereby to provide an indication of that condition.

The following is a description by way of example of one embodiment of the present invention reference being had to the accompanying drawings in which.

Figure 1:
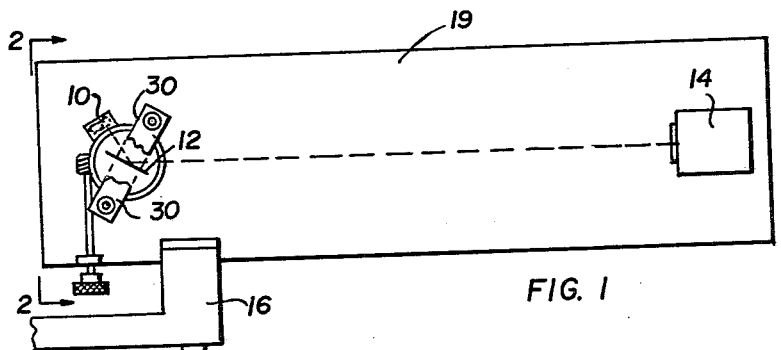
FIGURE 1 is a detail of the device as shown mounted on a shadow board for a railroad surveying apparatus.
Figure 2:
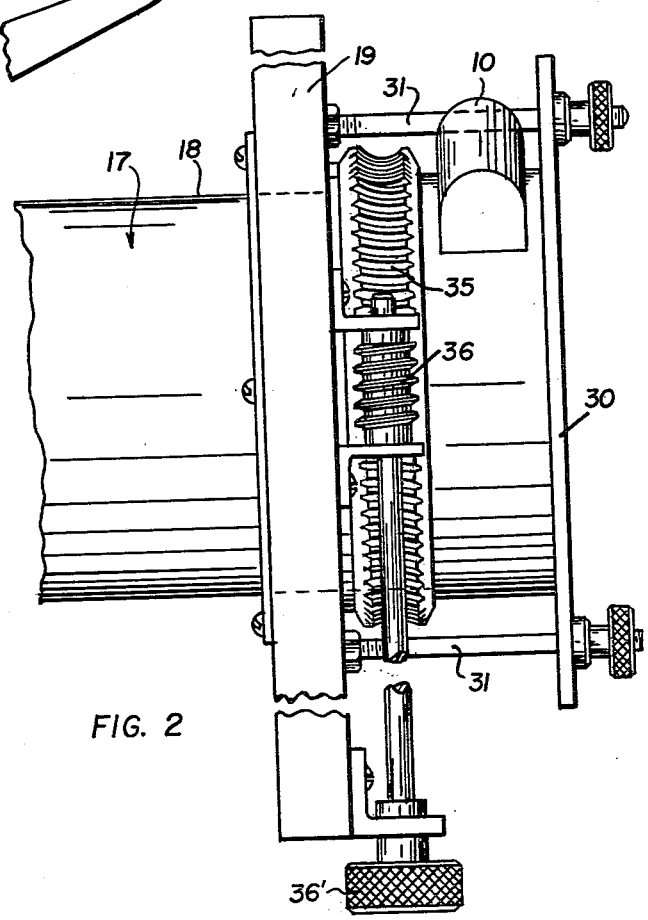
FIGURE 2 is an end elevation looking in the direction of the arrows of the device as seen in FIGURE 1 to an enlarged scale.
Figure 3:
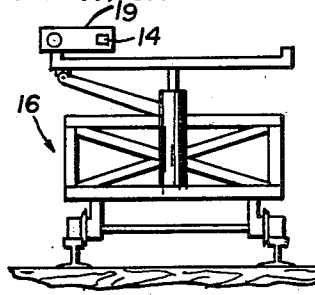
FIGURE 3 is a diagrammatic representation of the mounting of the shadow board on rail engaging wheels.
Figure 4:
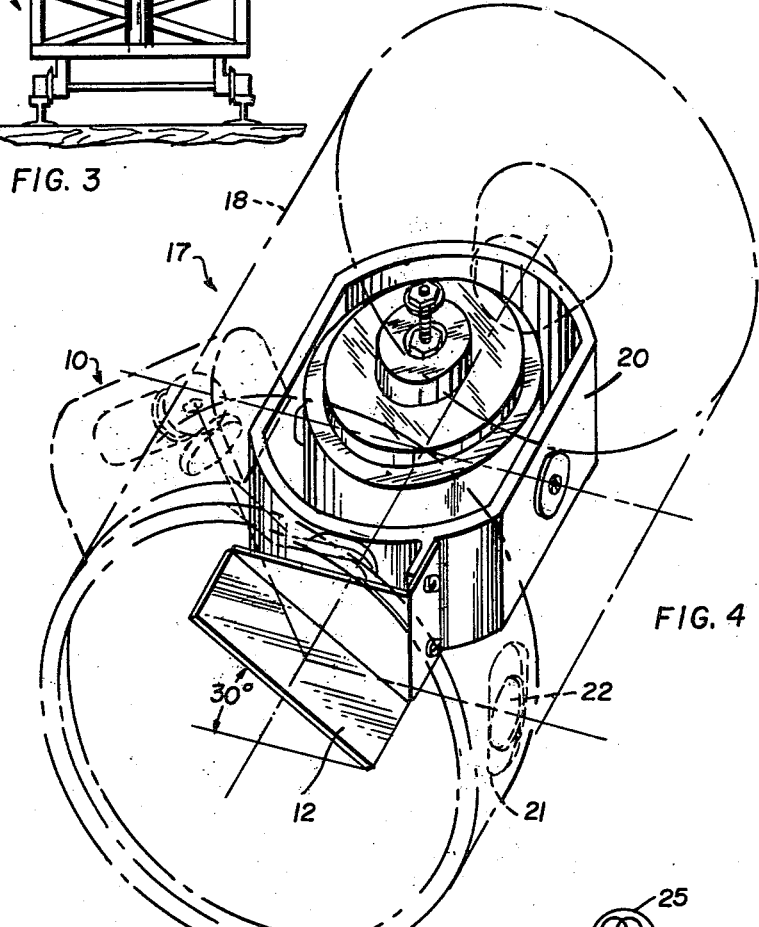
FIGURE 4 is a schematic representation of the gyroscopic means which form part of this invention.

Referring now to the drawings:

The invention comprises essentially a light source 10, a mirror 12 gyroscopically mounted to provide a reference datum, a light beam receiver 14, and a rail engaging support means 16 operable to tilt the light source 10 and the receiver 14 relative to the gyroscopically mounted mirror 12 in response to changes in rail cross-level or super-elevation conditions.

A gyroscope 17 is mounted by its casing 18 to shadow board 19 which extends in a direction transversely to the railroad track. The gyroscope may suitably be a vacuum driven gyroscope of the type used in aircraft to provide an artificial horizon. Such gyroscopes are provided with a gimbal 20 mounted in its roll plane, that is to say, in this instance, a plate extending transversely of the rails of the railroad track. In normal artificial horizons a horizon bar is fixed to this gimbal. In the present invention a mirror 12 replaces the horizon bar and the mirror is of similar light weight construction so that the gimbal 20 is not loaded. The angle of orientation to the horizontal of the mirror is preferably 30°. It will be clear that any other suitable gyroscope could be used e.g. an electrically driven gyroscope or an air pressure driven gyroscope but a vacuum gyroscope is generally to be preferred for economical reasons. The necessity is that the gyroscope will be able to provide a reference datum when connected to the mirror 12. Thus, when the shadow board is tilted, the gyroscope casing 18 is tilted with it but the mirror 12 is maintained as the reference datum by the action of the gyroscope 17.

Figure 5:
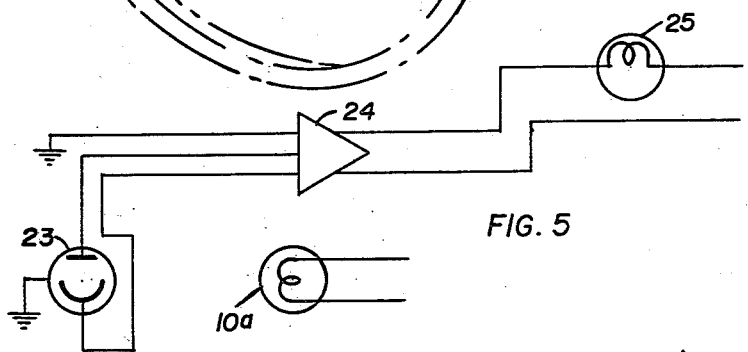
FIGURE 5 is a schematic representation of the circuit diagram of a visual indicator.

The light source 10 may include any suitable lamp 10a adapted to project a light beam onto the mirror 12 through the cover 21 of the gyroscope. The cover 21 is mounted at the front of the shadow board and takes the place of the normal bezel of the artificial horizon gyroscope. The cover 21 is provided with a window 22 through which the beam from the lamp 10a, reflected by the mirror 12, passes to the receiver 14. The receiver 14 preferably comprises a photoelectric cell 23. The photoelectric cell 23 is electrically connected to an amplifier 24 (FIGURE 5), which amplifies the output of the photoelectric cell 23 into an indicating signal which may be used to operate an indicating light 25, or as in the device described in my aforementioned application, to act as a command signal for jacks and tamping heads.

The lamp 10a is connected to the shadow board 19 through cover 21 in which it is mounted. The cover 21 is clamped in place against the shadow board by a plate 30 and screw threaded studs 31. A substantially circular pinion 35 and worm 36 are connected to the lamp 10a and shadow board respectively so that operation of the knurled knob 36′ may turn the worm 36 to move the pinion 35 and rotate the lamp 10a and cover 21 relative to the casing 17 providing the screw threaded studs 31 are loosened. This provides for the setting up of the device for the condition in which the gyroscope 17 settles down on a reference datum which is not absolutely horizontal.

Although a simple direct light path has been described above, that is to say, the light path from the lamp 10a to the mirror 12 to the receiver 14 it will be appreciated that mirrors may be provided to produce a longer optical path if the structural assembly makes it desirable but it is essential that some element forming the optical path be attached to some means such as the support means 16 which engage the rails of the track so that movement of that means, as a result of a change in cross-level or super-elevation, causes that element attached thereto to be moved relative to the reference datum mirror 12.

Also, it will be appreciated that the mirror could be replaced by a shadow element if the device were arranged to operate under opposite conditions. That is to say if the device were arranged to indicate on a "light received" out of cross-level condition rather than the preferred "light received" in cross-level condition.

Thus, in operation, provided the light from the lamp 10a reflected by the mirror 12 is received by the photoelectric cell 14 then, the track encountered by the member 16 is in cross-level. If one of the rails of the track is out of cross-level and the shadow board is tilted as a result of one rail being higher than the other and the lamp 10a and projector 14 are moved with the shadow board and the casing of the gyroscope relative to the reference datum mirror 12, immediately the photoelectric cell 22 ceases to receive the reflected light from the mirror 12 and the amplifier 24 sends a signal to the light 25 to indicate to the device operator that the track is out of cross-level.

Furthermore, when combined with the device as described in my aforementioned patent application, it is possible to raise one rail in super-elevation relative to the grade rail by deliberately tilting the shadow board downwardly a predetermined amount relative to its supporting means whilst on a track which is otherwise by cross-level to obtain a signal of "out of cross-level" and then by raising the desired rail relative to the grade rail to a point where the correct degree of super-elevation is required, to obtain a signal of "in cross-level." The shadow board being then in apparent cross-level and the receiver 14 again receiving the reflected beam from the mirror 12.

What I claim is:

1. A railroad track cross-level or super-elevation sensing device comprising a supporting frame engaging both rails of the track and extending in a transverse direction to said track; a light beam transmitter and a photoelectric cell beam receiver attached to said frame; a gyroscope having a gimbal positioned in its roll plane attached by its casing to said frame; beam reflector means located in the path of the light beam between said transmitter and said receiver and attached to said gimbal to provide a reference datum; means for moving at least one of said transmitter and receiver to a selected position with respect to said gyroscope casing; means responsive to the reception of the light beam by said receiver to indicate the cross-level or super-elevation condition of the railroad track; whereby movement of the supporting frame in response to a change in track cross-level or super-elevation condition moves said transmitter and receiver relative to said reference datum to provide an indication of that condition.

2. A device as claimed in claim 1 in which said means responsive to the reception of the light beam by said receiver includes an electrical signal generating means electrically connected to said photoelectric cell and visual indicator means operated by the signal so generated.

3. A device as claimed in claim 1 in which the gyroscope is provided with a cover enclosing said reflector means and having a window therein for the passage of the beam reflected by said reflector means from said transmitter to said receiver and in which the light transmitter comprises a lamp externally attached to said cover and projecting therethrough.

4. A device as claimed in claim 7 in which the means for moving at least one of said transmitter and receiver comprises threaded means attached to said lamp externally of the cover and operable to move said lamp relative to said gyroscope casing.

5. A railroad track cross-level or super-elevation sensing device comprising a supporting frame engaging both rails of the track and extending in a transverse direction to said track; a light beam transmitter and a photoelectric cell beam receiver attached to said frame; a gyroscope, having a gimbal positioned in its roll plane, attached by its casing to said frame; means to interfere with the transmitted beam located in the path of the light beam between said transmitter and said receiver and attached to said gimbal to provide a reference datum; means for moving at least one of said transmitters and receivers to a selected position with respect to said gyroscope casing; means responsive to the reception of the light beam by said receiver to indicate the cross-level or super-elevation condition of the railroad track; whereby movement of the supporting frame in response to a change in track cross-level or super-elevation condition moves said transmitter and receiver relative to said reference datum to provide an indication of that condition.

6. A device as claimed in claim 5 in which the means to interfere with the transmitted beam comprises a shadow element.

References Cited in the file of this patent

UNITED STATES PATENTS

| 1,998,948 | Wittkuhns | Apr. 23, 1935 |
|---|---|---|
| 2,144,946 | Trapnell | Jan. 24, 1939 |
| 2,200,431 | Rateau | May 14, 1940 |
| 2,245,478 | Jann et al. | June 10, 1941 |
| 2,470,773 | Haskins | May 24, 1949 |
| 2,512,598 | Barkalow | June 27, 1950 |
| 2,515,200 | Draper | July 18, 1950 |